United States Patent
Farkash et al.

(10) Patent No.: US 12,430,366 B2
(45) Date of Patent: Sep. 30, 2025

(54) DATA CLASSIFICATION USING DYNAMICALLY FILTERED FORMATS

(71) Applicant: International Business Machines Corporation, Armonk, NY (US)

(72) Inventors: Ariel Farkash, Shimshit (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 18/191,450

(22) Filed: Mar. 28, 2023

(65) Prior Publication Data
US 2024/0330322 A1    Oct. 3, 2024

(51) Int. Cl.
*G06F 16/00* (2019.01)
*G06F 16/22* (2019.01)
*G06F 16/28* (2019.01)

(52) U.S. Cl.
CPC ........ *G06F 16/285* (2019.01); *G06F 16/2246* (2019.01)

(58) Field of Classification Search
CPC ............................ G06F 16/285; G06F 16/2246
See application file for complete search history.

(56) References Cited

U.S. PATENT DOCUMENTS

| | | | |
|---|---|---|---|
| 8,498,956 B2 | 7/2013 | Srinivasan et al. | |
| 11,023,497 B2 | 6/2021 | Kabra et al. | |
| 2020/0380046 A1* | 12/2020 | Guo | G06F 16/90344 |
| 2021/0365802 A1 | 11/2021 | Sofer et al. | |

FOREIGN PATENT DOCUMENTS

CN     104636493 A     5/2015

OTHER PUBLICATIONS

Luc Manigot, "Data Discovery with Dynamic Data Classification", Published in Sinequa, Apr. 12, 2022, 13 pages.

* cited by examiner

*Primary Examiner* — Paul Kim
(74) *Attorney, Agent, or Firm* — Caleb D. Wilkes

(57) ABSTRACT

An example system includes a processor to automatically generate a regular expression automaton matching a textual pattern of a received format. The regular expression automaton is a superset of the format. The processor can automatically generate a multi-dimensional filter to be applied to input data based on the generated regular expression automaton.

20 Claims, 6 Drawing Sheets

300B

DATA CLASSIFICATION USING DYNAMICALLY FILTERED FORMATS

BACKGROUND

The present techniques relate to data classification. More specifically, the techniques relate to structured data classification.

SUMMARY

According to an embodiment described herein, a system can include processor to automatically generate a regular expression automaton matching a textual pattern of a received format, wherein the regular expression automaton is a superset of the format. The processor can also further automatically generate a multi-dimensional filter to be applied to input data based on the generated regular expression automaton. The processor can also create a filtering process that saves a set of formats corresponding to the multi-dimensional filter. The system thus enables an automated manner for creating a filtering process. Preferably, the processor can also receive an input data value, apply the filtering process on the input data value to identify a relevant set of formats, and execute a format matching on the relevant set of formats for the input data value. In this embodiment, the system can efficiently execute a format matching using the automatically created filtering process. Preferably, the processor can extract features from the input data value and map the extracted features to a corresponding set of formats using the multi-dimensional filter. In this embodiment, the system provides an automated manner of filtering formats for a more efficient classification of input values. Preferably, the multi-dimensional filter includes a mapping of a number of features to a particular format. In this embodiment, the system provides an automated manner of filtering formats for a more efficient classification. Preferably, the processor can generate the regular expression automaton by generating a regular expression a using a regular expression format and generating the regular expression automaton based on the generated regular expression. In this embodiment, the system provides a fully automatic method of generating regular expression automatons. Optionally, the processor can automatically generate a simplified regular expression based on an automatically generated regular expression, and generate the regular expression automaton based on the simplified regular expression. In this embodiment, the system provides an even more efficient filtering process. Optionally, the processor can receive additional externally derived features and analyze the externally directed features together with the features of the regular expression automaton to generate the filtering process. In this embodiment, the system enables additional externally derived features to be integrated with minimal performance loss.

According to another embodiment described herein, a method can include automatically generating, via a processor, a regular expression automaton matching a textual pattern of a received format, wherein the regular expression automaton is a superset of the format. The method can further include automatically generating, via the processor, a multi-dimensional filter to be applied to input data based on the generated regular expression automaton. The method can also further include automatically generating, via the processor, a multi-dimensional filter to be applied to input data based on the generated regular expression automaton. The method can also include creating, via the processor, a filtering process that saves a set of formats corresponding to the multi-dimensional filter. Thus, the method enables an automated manner for creating a filtering process. Preferably, the method includes receiving an input data value, applying the filtering process on the input data value to identify a relevant set of formats, and executing a format matching on the relevant set of formats for the input data value. In this embodiment, the method enables efficient execution of a format matching using the automatically created filtering process. Preferably, applying the filtering process includes extracting features from the input data value, and mapping the extracted features to a corresponding set of formats using the multi-dimensional filter. In this embodiment, the method enables an automated manner of filtering formats for a more efficient classification of input values. Optionally, the method includes preselecting a multi-dimensional feature mapping to a set of formats from a format repository such that an average size of the format set on each leaf of a filtering tree may be small as possible while having a minimal amount of features. In this embodiment, the method enables more efficient automated generation of the filtering process. Preferably, automatically generating the regular expression automaton includes generating a regular expression a using a finite regular expression format, and generating the regular expression automaton based on the generated regular expression. In this embodiment, the method provides a fully automatic method of generating regular expression automatons. Optionally, automatically generating the regular expression automaton includes automatically generating a simplified regular expression based on an automatically generated regular expression and generating the regular expression automaton based on the simplified regular expression. In this embodiment, the method provides an even more efficient filtering process. Optionally, receiving additional externally derived features and analyzing the externally directed features together with the features of the regular expression automaton. In this embodiment, the method enables additional externally derived features to be integrated with minimal performance loss.

According to another embodiment described herein, a computer program product for classifying data can include computer-readable storage medium having program code embodied therewith. The program code executable by a processor to cause the processor to automatically generate a regular expression automaton matching a textual pattern of a received format, wherein the regular expression automaton is a superset of the format. The program code can also cause the processor to automatically generate a multi-dimensional filter to be applied to input data based on the generated regular expression automaton. The program code can also cause the processor to create a filtering process that saves a set of formats corresponding to the multi-dimensional filter. Thus, the computer program product enables an automated manner for creating a filtering process. Preferably, the program code can also cause the processor to receive an input data value, apply a filtering process on the input data value to identify a relevant set of formats, and execute a format matching on the relevant set of formats for the input data value. In this embodiment, the computer program product enables efficient execution of a format matching using the automatically created filtering process. Preferably, the program code can also cause the processor to generate the regular expression automaton by generating a regular expression a using a finite regular expression format and generating the regular expression automaton based on the generated regular expression. In this embodiment, the computer program product enables a fully automatic method of generating regular expression automatons. Optionally, the program code can also cause the processor to also further automatically generate a simplified regular expression based on an automatically generated regular expression, and generate the regular expression automaton based on the simplified regular expression. In this embodiment, the computer program product enables an even more efficient filtering process. Optionally, the program code can cause the processor to receive additional externally derived features and analyze the externally directed features together with features of the regular expression automaton to generate the filtering process. In this embodiment, the computer program product enables additional externally derived features to be integrated with minimal performance loss.

DETAILED DESCRIPTION

Figure 1:
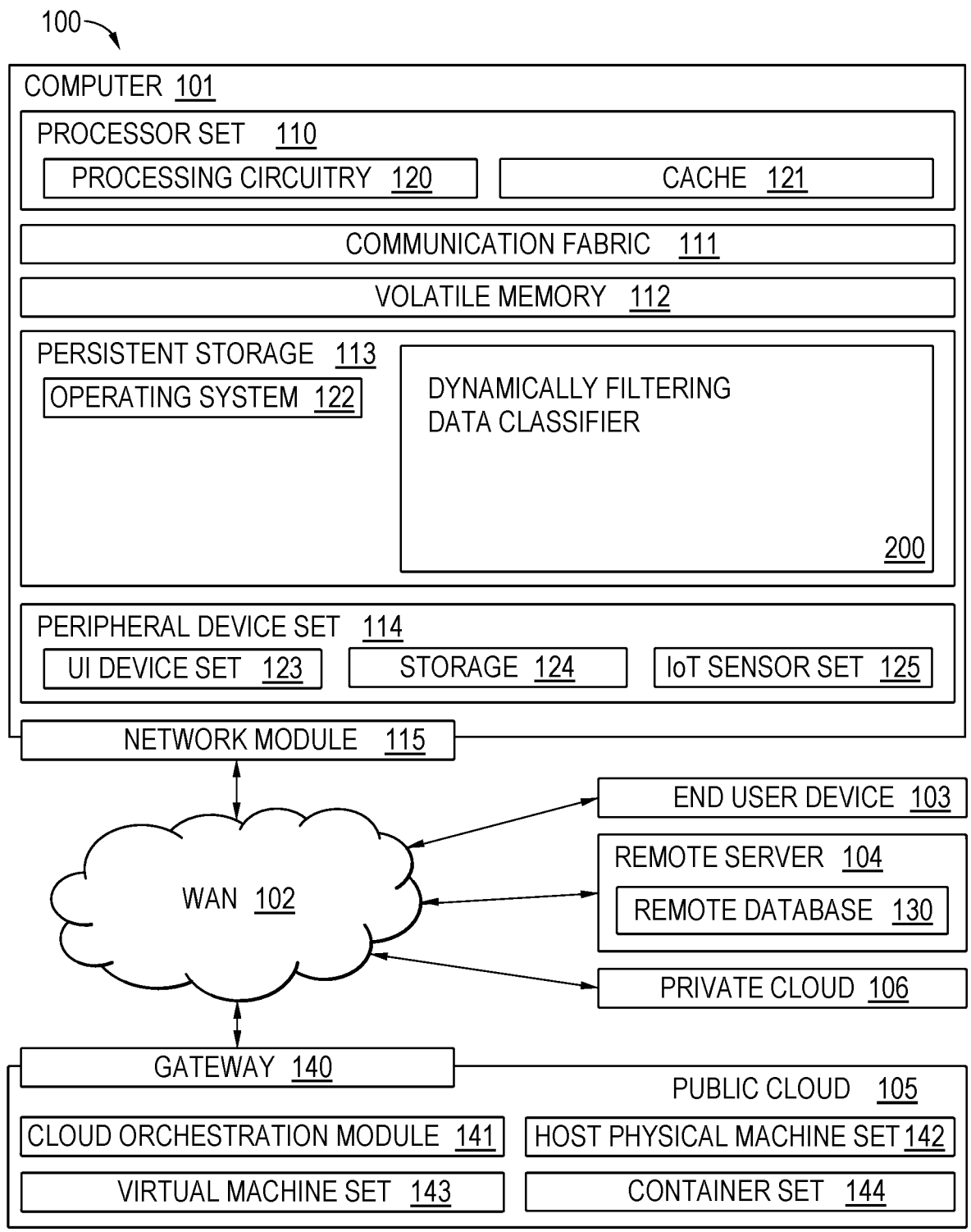
FIG. 1 is a block diagram of an example computing environment that contains an example of an environment for the execution of at least some of the computer code involved in performing the inventive methods, such as dynamic filtering data classification.

Structured data classification, or tabular data classification, is a challenging problem with several complementary technologies that can contribute. One such method takes as input column values and tries to identify existing predefined data types known in the system. This may be executed by matching to a predefined set of regular expressions.

Alternatively, if leveraging a format, this can be performed by using format.match( ) on all existing formats in the format library. As used herein, a format is a data object that is able to match, search, and rank itself. For example, a format matching may be given a string return a Boolean yes if string is a legal string in the format. A format matching may also include validation of any additional format restrictions. For example, a format restriction may be a checksum performed and validated against one of the digits of the format. In various examples, the format matching may first check for the various restrictions of the format first, and only then perform a regular expression matching. In a rank, a given string of the format will produce a unique and consistent integer bound by the size of the domain. In various examples, the process is reversible, thus, the original string can also be reproduced from a given integer. A format may include a finite regular expression. The finite regular expression format uses a regular expression match and search capabilities, and uses a one to one transformation for a match result to an integer that enables a ranking to be performed among all possible instances of the finite regular expression.

However, both of these methods may be costly because the format matching or regular expression matching operations, especially on values that do not match, may take a long time accumulatively when assessing a large set of data types making the matching process not feasible. In particular, format matching itself may include regular expression matching, which is costly. Moreover, most measures taken to speed up this process have significant drawbacks. The process is less accurate if a small sample of data is used, and involving manual and/or heuristic filtering to reduce the amount of values to be matched against entails a large amount of effort and potential loss of accuracy. As one example, a length filter may be used, such as that phone number must be of a certain length. Thus, a specific filter may be manually designed for each class of values. However, this method is both costly because it is manual and inaccurate because it is prone to human error, and also lacks adaptivity in the case of updates. For example, manual filters may be hard to maintain and correct for bug fixes or when additional features are added. Moreover, manual filtering is still time consuming because all of the data classes must be looped over for matching the manual filters. Sampling, another method that is sometimes used, involves taking a sample of the column contents and matching only against the sample. However, sampling is also prone to statistical error.

According to embodiments of the present disclosure, a system includes a processor to automatically generate a regular expression automaton matching a textual pattern of a received format. The regular expression automaton is a superset of the format. The processor can automatically generate a multi-dimensional filter to be applied to input data based on the generated regular expression automaton. In some embodiments, the processor can receive an input data value, apply the filtering process on the input data value to identify a relevant set of formats, and execute a format matching on the relevant set of formats for the input data value. The processor may apply the match operation only on a small subset of the input data that pass the filter thus achieving significant performance improvement without any loss of accuracy. The embodiments can thus dynamically and automatically build a set of filters to reduce the number of match operations given a set of data classes thereby increasing data classification performance without affecting accuracy. Thus, embodiments of the present disclosure enable efficient and accurate identification of specific data classes for data values that are in received tabular data. In particular, because the set of features used by the embodiments are agnostic to the number of data classes of potential inputs, the embodiments are highly adaptable to new data classes and new formats.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamically filtering data classifier 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
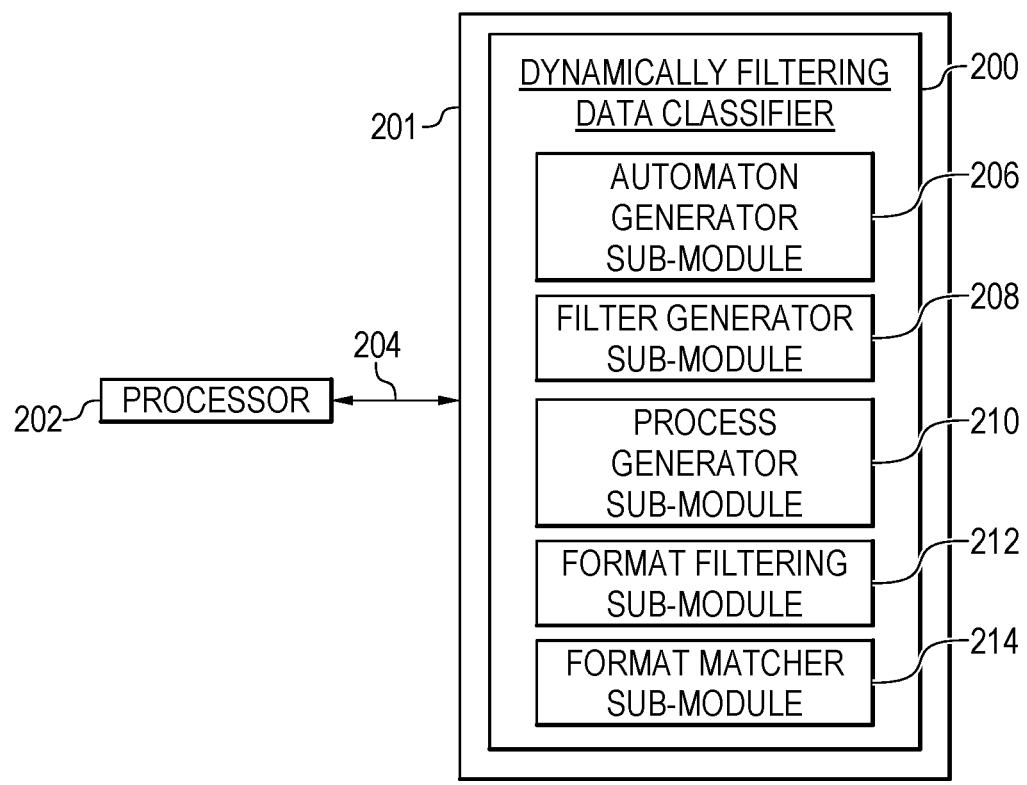
FIG. 2 is an example tangible, non-transitory computer-readable medium that can classify data using a dynamically filtered set of formats.

Referring now to FIG. 2, a block diagram is depicted of an example tangible, non-transitory computer-readable medium 201 that can classify data using a dynamically filtered set of formats. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the methods 300A and 300B of FIGS. 3A and 3B.

The various software components discussed herein may be stored on the tangible, non-transitory, computer-readable medium 201, as indicated in FIG. 2. For example, dynamically filtering data classifier 200 includes an automaton generator sub-module 206 that includes code to automatically generate a regular expression automaton matching a textual pattern of a received format. In various examples, the regular expression automaton is a superset of the format. In some examples, the automaton generator sub-module 206 includes code to generate the regular expression automaton by generating a regular expression using a regular expression format and generating the regular expression automaton based on the generated regular expression. In some embodiments, the automaton generator sub-module 206 includes code to automatically generate a simplified regular expression based on an automatically generated regular expression, and generate the regular expression automaton based on the simplified regular expression. The dynamically filtering data classifier 200 also includes a filter generator module 208 that includes code to automatically generate a multi-dimensional filter to be applied to input data based on the generated regular expression automaton. In some examples, the filter generator module 208 further includes code to receive additional externally derived features and analyze the externally directed features together with features of the regular expression automaton to generate the filtering process. The dynamically filtering data classifier 200 also includes a process generator module 210 that includes code to create a filtering process that saves a set of formats corresponding to the multi-dimensional filter. For example, the filter process may include a mapping of a set of features to a set of formats. The dynamically filtering data classifier 200 also includes a format filtering sub-module 212 that includes code to receive an input data value and apply the filtering process on the input data value to identify a relevant set of formats. For example, the format filtering sub-module 212 includes code to extract features from the input data value and map the extracted features to a corresponding set of formats using the multi-dimensional filter. The dynamically filtering data classifier 200 also includes a format matcher module 214 that includes code to execute a format matching on the relevant set of formats for the input data value.

It is to be understood that any number of additional software components not shown in FIG. 2 may be included within the tangible, non-transitory, computer-readable medium 201, depending on the specific application. For example, the computer-readable medium 201 may further include instructions to receive a multi-dimensional feature mapping that is preselected to a set of formats from a format repository such that an average size of the format set on each leaf of a filtering tree may be small as possible while having a minimal amount of features.

Figure 3A:
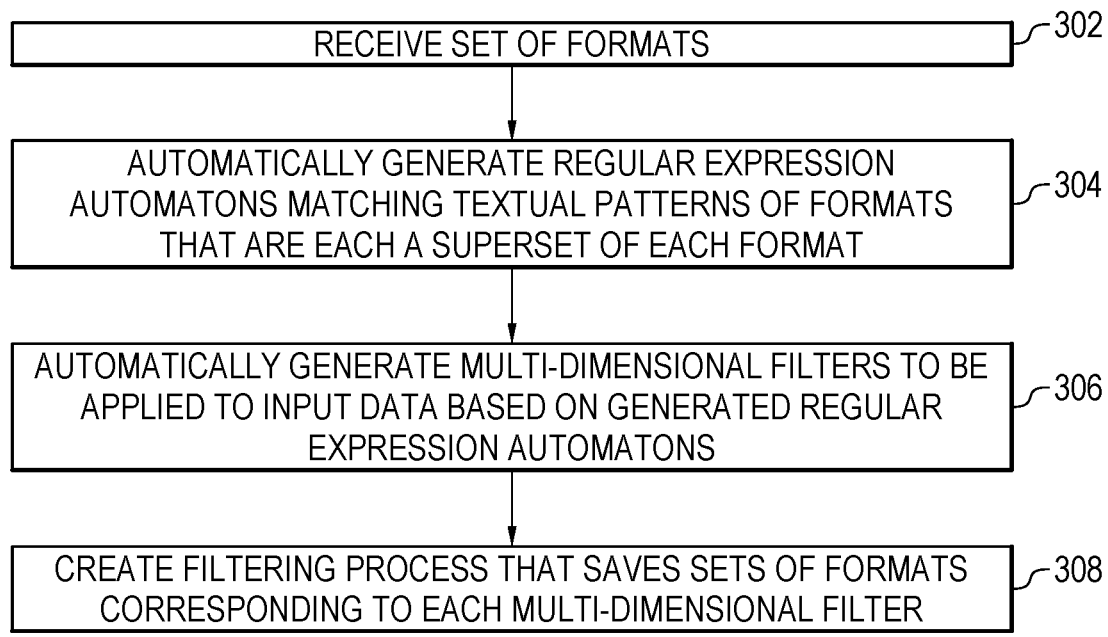
FIG. 3A is a process flow diagram of an example method that can create a filtering process for identifying formats belonging to various multi-dimensional filters.

FIG. 3A is a process flow diagram of an example method that can create a filtering process for identifying formats belonging to various multi-dimensional filters. The method 300A can be implemented with any suitable computing device, such as the computer 101 of FIG. 1. For example, the methods described below can be implemented by the processor set 110 of FIG. 1. The method 300A may be executed by the processor set 110 at a design time.

At block 302, a set of formats is received. As one example, a set of 320 predefined formats may be received from a format repository. In various examples, each of the formats may have restrictions such as Luhn checksums, among other restrictions. For example, a Luhn checksum is a checksum calculated according to the Luhn algorithm also known as the "modulus 10" or "mod 10" algorithm.

At block 304, regular expression automatons matching textual patterns of the formats that are each a superset of each format are automatically generated. For example, a regular expression may automatically be generated for each of the textual patterns of the formats. For example, a regular expression may be generated to cover the textual representation of a format without any additional restrictions that the format may have. As one example, if the format is a nine digit regular expression with a Luhn checksum on the 9th digit, then the regular expression created may match any 9 digit value without checking the checksum. In some examples, more generic regular expressions may be generated that are faster to run but may contain potentially more false positives. For example, in case of the format integer range 1000-8700, a \d{4} regular expression may be generated to be used as a rougher basis for generating a filter. The generated regular expressions may then be converted into finite state automatons, referred to herein as regular expression automatons. In various examples, the regular expression automatons may cover all instances of a format, but may also cover some non-instances as well.

At block 306, multi-dimensional filters to be applied to input data are automatically generated based on the generated regular expression automatons. For example, the regular expression automatons may be traversed to determine all possible combinations of features for each multi-dimensional filter. By traversing the automatons, several filters that can be efficiently checked in runtime can be identified in advance. Some examples of filters can include minimum and maximum length, may/may not/must contain special characters such as @, may/may not/must contain digits/alphabet, must start/end with digits/alphabet, etc.

At block 308, a filtering process that saves sets of formats corresponding to each multi-dimensional filter is created. For example, the filtering process may be a tree that enables identification of sets of formats that correspond to each multi-dimensional filter. For each format's regular expression automaton, the above features are analyzed and a multi-dimensional feature mapping is created to a set of formats in design time. For example, the multi-dimensional feature mapping may include a set of multi-dimensional filters that map a set of features to a set of formats. In this manner, a subset of the original set of formats may thus be efficiently identified and saved for later use. As one example, a multi-dimensional filter may only correspond to three of 320 formats received from a format repository.

The process flow diagram of FIG. 3A is not intended to indicate that the operations of the method 300A are to be executed in any particular order, or that all of the operations of the method 300A are to be included in every case. Additionally, the method 300A can include any suitable number of additional operations. For example, the filters described in method 300A are chosen and known in advance, with the regular expression automatons being analyzed against those filters, and the filtering process may then use those filters exactly. However, in various examples, the automaton analysis can result in a myriad of relevant filters which can then used in combination with filters resulting from other analysis to build a targeted filtering process containing only relevant filters that is used in runtime.

Figure 3B:
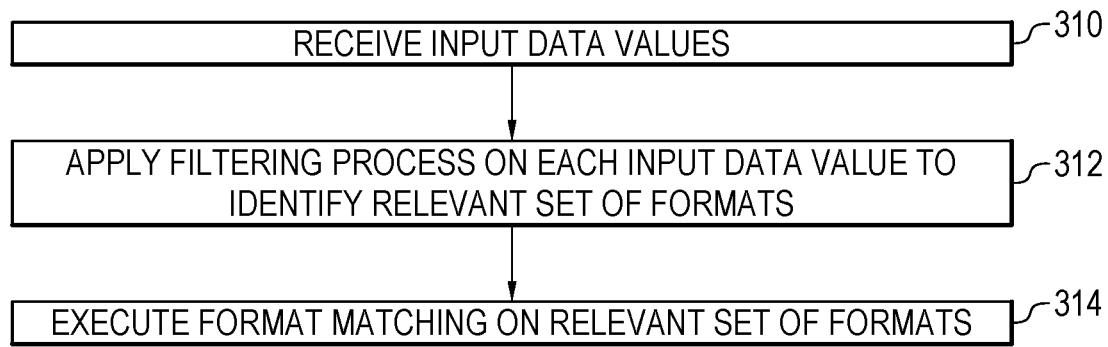
FIG. 3B is a process flow diagram of an example method that can classify data using a dynamically filtered set of formats.

FIG. 3B is a process flow diagram of an example method that can classify data using a dynamically filtered set of formats. The method 300B can be implemented with any suitable computing device, such as the computer 101 of FIG. 1. For example, the methods described below can be implemented by the processor set 110 of FIG. 1. The method 300B may be executed by the processor set 110 at runtime.

At block 310, input data values are received. For example, the input data values may be strings, or any other type of textual data.

At block 312, the filtering process is applied on each input data value to identify a relevant set of formats. For example, features are assessed on an input value and directly mapped to their corresponding set of formats that are suspected matches using a multi-dimensional filter that considered several features in the assessment. Thus, a relevant set of formats may be identified for each input data value. As one example, a leaf corresponding to a particular input data value may be identified in a tree and a set of relevant formats selected based on the identified leaf. Thus, the filtering process may include extracting features from each input data value and mapping the extracted features for each input data value to a corresponding set of formats. In this manner, the processor may effectively apply a set of filters on each input data value to identify a relevant set of formats for each input data value.

At block 314, a format matching is executed for each input value on the relevant set of formats. Thus, for example, the format matching may be executed on three formats identified as relevant to a particular input data value at block 312, rather than on all of the 320 formats stored in a format repository. In various examples, additional constraints, such as Luhn checksums or other constraints included in a format, may be checked during the format matching. For example, the constraints may be checked before regular expression matching of text is performed. In this manner, the format matching may be more accurate than a simple regular expression matching. In fact, the accuracy of such format matching is identical to running format matches for the input data values on all the formats. Moreover, the format.match ( ) function is only run on the input value against these list of formats, and not run against all the rest of the formats where a match is known to return false. Thus, the format matching is also very efficient when compared to running all input values through a format match against all of the formats. Since the analysis of the filters per input value is negligible in comparison to running regular expression matches, reducing the amount of matches increases performance significantly. Thus, even if a filter existed for each format, and the format match operation would only run in case the input value passes filter, the process would still be less efficient than the method 300B, as the process would iterate over the filters of each format serially instead of mapping directly to the relevant set of format as is the case in the proposed dynamic classification of method 300B.

The process flow diagram of FIG. 3B is not intended to indicate that the operations of the method 300B are to be executed in any particular order, or that all of the operations of the method 300B are to be included in every case. Additionally, the method 300B can include any suitable number of additional operations.

Figure 4:
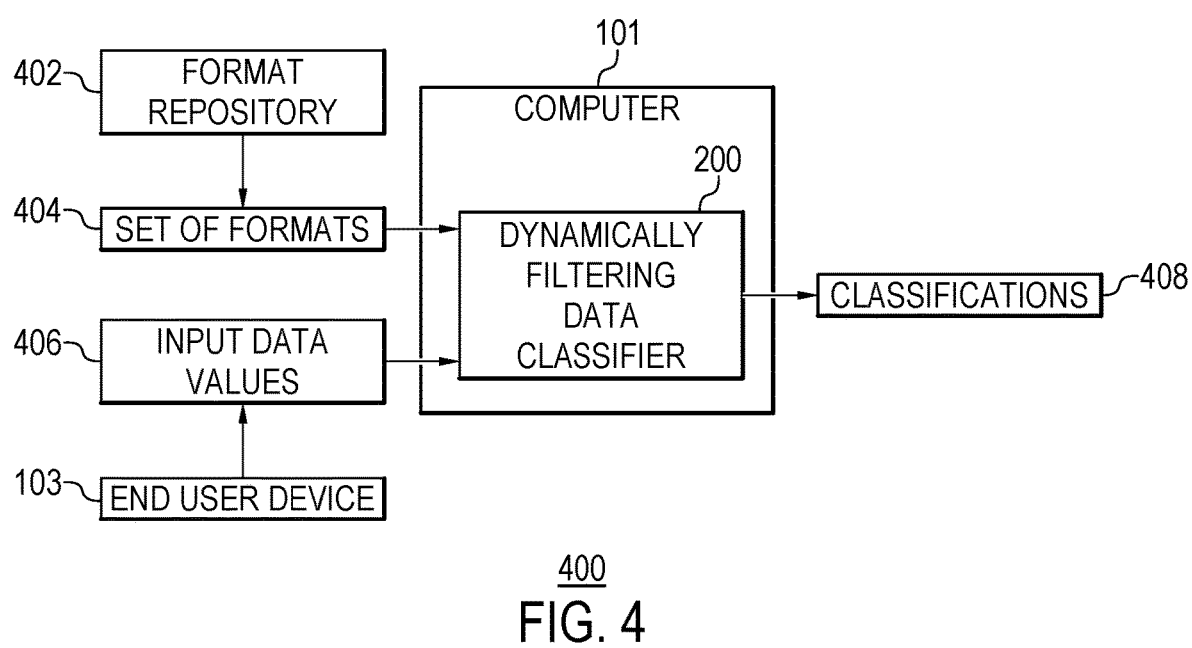
FIG. 4 is a block diagram of an example system for classifying data using a dynamically filtered set of formats.

With reference now to FIG. 4, a block diagram shows an example system for classifying data using a dynamically filtered set of formats. The example system 400 of FIG. 4 includes similarly referenced elements from FIG. 1. The system 400 further includes a format repository 402. The system 400 further includes a set of formats 404 received from the format repository 402. For example, the set of formats 404 may be any number of formats received from a format repository. As one example, a set of 320 different types of formats may be received from the format repository 402. The system 400 includes input data values 406. For example, the input data values 406 may be received at runtime from an end user device 103. The system 400 also includes a computer 101 shown generating classifications 408. The computer 101 includes a dynamically filtering data classifier 200.

In the example of FIG. 4, the dynamically filtering data classifier 200 can automatically generate a regular expression automaton matching a textual pattern of received formats 404. For example, the dynamically filtering data classifier 200 can generate the regular expression automaton by generating a regular expression using a regular expression format and generating the regular expression automaton based on the generated regular expression. In some examples, the dynamically filtering data classifier 200 can automatically generate a simplified regular expression based on an automatically generated regular expression, and generate the regular expression automaton based on the simplified regular expression. The regular expression automaton is a superset of the format. The dynamically filtering data classifier 200 can automatically generate a multi-dimensional filter to be applied to input data values 406 based on the generated regular expression automaton. In some examples, a multi-dimensional feature mapping is preselected to a set of formats from a format repository such that an average size of the format set on each leaf of a filtering tree may be small as possible while having a minimal amount of features. The dynamically filtering data classifier 200 can create a filtering process that saves a set of formats corresponding to the multi-dimensional filter. For example, the filtering process may be a mapping that maps features to a particular set of formats. In some examples, the dynamically filtering data classifier 200 can receive additional externally derived features and analyze the externally directed features together with the features of the regular expression automaton to generate the filtering process.

Still referring to FIG. 4, the dynamically filtering data classifier 200 can then receive an input data value 406. For example, the input data value may be a string. The dynamically filtering data classifier 200 can apply the filtering process on the input data value to identify a relevant set of formats. For example, the dynamically filtering data classifier 200 can extract features from the input data value and map the extracted features to a corresponding set of formats using the multi-dimensional filter. The dynamically filtering data classifier 200 can execute a format matching on the relevant set of formats for the input data value. For example, the format matching may then result in a classification 408. For example, the classification 408 may identify one or more formats that each of the input data values matches.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional computers, formats, input data values, or outputs, etc.). For example, in some embodiments, the dynamically filtering data classifier 200 may be implemented across a number of computers 101. As one examples, the filtering process may be generated by a first computer and used by a second computer to perform format matching in input data values 406.

Figure 5:
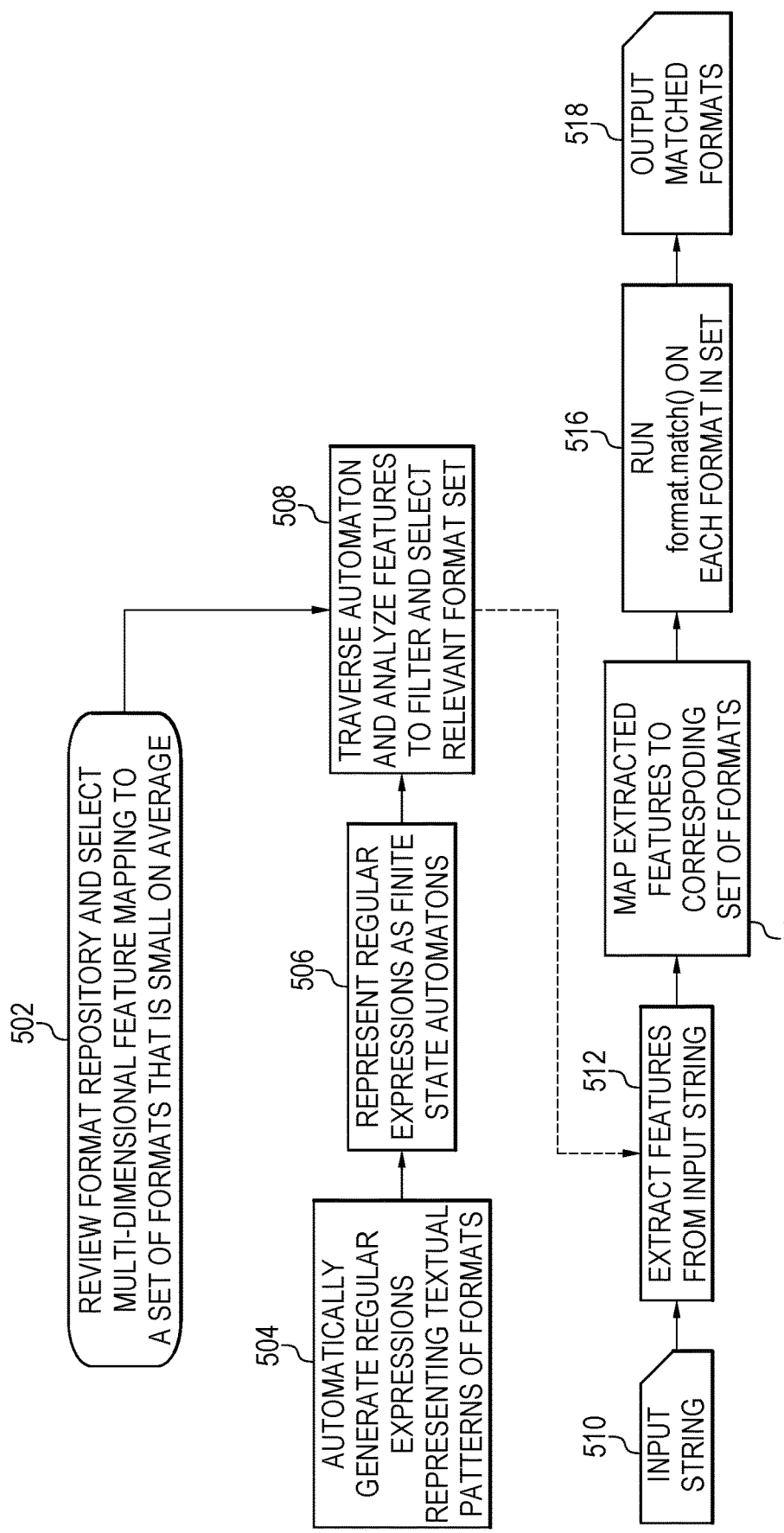
FIG. 5 is a detailed process flow diagram of an example process for classify data using a dynamically filtered set of formats.

FIG. 5 is a detailed process flow diagram of an example process for classifying data using a dynamically filtered set of formats. The process 500 can be implemented using the methods 300A and 300B of FIGS. 3A and 3B with any suitable computing device, such as the computer 101 of FIG. 1. For example, the process described below can be implemented by the processor set 110 of FIG. 1.

At block 502, a format repository is reviewed and multi-dimensional feature mapping selected to a set of formats that is small on average. For example, the selected set of formats may have a size in the range of one to 14 formats. As one example, before design time, a set of multi-dimensional features may be selected from a repository. For example, a set of multi-dimensional features may be selected such that an average size of the format set on each leaf may be small as possible while having a minimal amount of total selected features. In various examples, the set of selected features may include a minimum and maximum length, presence of any or particular special characters, content including digits or alphabetic content, and start or ending with digits or alphabetic characters, among other types of features.

At block 504, regular expressions representing the textual pattern of a format are automatically generated from a received set of formats. For example, the regular expressions may be automatically generated using a regular expression format. In some examples, simplified regular expressions may also be generated. For example, the simplified regular expressions may be supersets of the generated regular expressions that are less accurate but more efficiently processed.

At block 506, the regular expressions are represented as finite state automatons. For example, the finite regular expression can be converted into a finite state automaton to generate a regular expression automaton.

At block 508, the finite state automatons are traversed and features analyzed to filter and select a relevant format set. For example, the finite state automatons may be traversed using analysis of the features selected during research time at block 502 and decision points for a tree generated accordingly. In some examples, additional externally derived features may also be received and analyzed to generate the relevant format set. For example, with the addition of formats to the format repository, additional filters may be useful to effectively separate groups of features. Thus, additional features may be used to filter and select the relevant format set with additional formats being available. A mapping from a set of selected features to a set of formats may thus be generated, where the selected features are keys of the mapping and the set of formats are the values in the mapping.

At block 510, an input string is received. For example, the input string may be an ordered sequence of characters.

At block 512, features are extracted from the input string. For example, the features may include the length of the string, whether the string includes any special characters, whether the string includes any numbers, whether the string begins or ends with a number, among other selected features from block 502.

At block 514, the extracted features are mapped to a corresponding set of formats. For example, the extracted features may be mapped using the mapping generated at block 508. In this manner, an original set of formats are filtered to a set of formats corresponding to the extracted features.

At block 516, a matching is performed for the input string on each format in the set of formats corresponding to the extracted features. For example, a format.match( ) operation may be iteratively performed on each format in the set of formats corresponding to the extracted features. The format matching may thus ensure accuracy of the matching of the input string to particular formats.

At block 518, a set of matched formats is output. For example, the matched formats may be formats that successfully match with the input string in the format matching.

The process flow diagram of FIG. 5 is not intended to indicate that the operations of the process 500 are to be executed in any particular order, or that all of the operations of the process 500 are to be included in every case. Additionally, the process 500 can include any suitable number of additional operations.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a processor;
    a memory communicatively coupled to the processor; and
    program instructions stored in the memory, wherein the program instructions when executed by the processor cause the processor to:
        automatically generate regular expression automatons that match textual patterns of received formats, wherein each regular expression automaton is a superset of the respective format;
        traverse the generated regular expression automatons to determine features:
        automatically generate multi-dimensional filters by combining multiples of the features from the generated regular expression automatons, wherein each filter of the multi-dimensional filters includes features of a respective format set that has from two to fourteen total formats;
        receive input data;

extract features from the input data;
apply the multi-dimensional filters to the extracted features of the received input data such that a relevant set of formats is identified, the relevant set of formats being a subset of a total number of the received formats;
execute a format matching exclusively on the identified relevant set of formats for the input data; and
as determined via the executing of the format matching on the identified relevant set of formats, output a set of one or more matched formats from the identified relevant set of formats and respective ranks of the input data with respect to the one or more matched formats.

2. The system of claim 1, wherein the automatic generating of the regular expression automatons comprises:
automatically generating a regular expression using a regular expression format of the received formats, and
automatically generating a respective one of the respective regular expression automatons based on the generated regular expression.

3. The system of claim 1, wherein the program instructions are further for execution to cause the processor to:
automatically generate a simplified regular expression based on an initially generated regular expression, and
automatically generate a respective one of the regular expression automatons based on the simplified regular expression.

4. The system of claim 1, wherein the program instructions are further for execution to cause the processor to:
receive additional externally derived features; and
analyze the externally derived features together with features of the regular expression automatons to generate the multi-dimensional filters.

5. A computer-implemented method comprising:
automatically generating, via a processor, regular expression automatons that match textual patterns of received formats, wherein each regular expression automaton is a superset of the respective format;
traversing the generated regular expression automatons to determine features;
automatically generating, via the processor, multi-dimensional filters by combining multiples of the features from the generated regular expression automatons, wherein each filter of the multi-dimensional filters includes features of a respective format set that has from two to fourteen total formats;
receiving, via the processor, input data;
extracting features from the input data;
applying, via the processor, the multi-dimensional filters to the extracted features of the received input data such that a relevant set of formats is identified, the relevant set of formats being a subset of a total number of the received formats;
executing, via the processor, a format matching exclusively on the identified relevant set of formats for the input data; and
as determined via the executing of the format matching on the identified relevant set of formats, outputting via the processor a set of one or more matched formats from the identified relevant set of formats and respective ranks of the input data with respect to the one or more matched formats.

6. The computer-implemented method of claim 5, further comprising:
generating a filtering tree wherein each of the multi-dimensional filters is represented by a respective leaf of the filtering tree and each respective leaf indicates a respective format set that corresponds to the respective multi-dimensional filter, and the respective format set is selected from the received formats; and
generating a multi-dimensional feature mapping for the filtering tree such that an average size of the format set on each respective leaf is minimized;
wherein the identifying of the relevant set of formats includes searching the filtering tree.

7. The computer-implemented method of claim 5, wherein the automatically generating the regular expression automatons comprises:
automatically generating a regular expression using a finite regular expression format of the received formats; and
automatically generating a respective one of the regular expression automatons based on the generated regular expression.

8. The computer-implemented method of claim 5, wherein automatically generating the regular expression automatons comprises:
automatically generating a simplified regular expression based on an initially generated regular expression; and
automatically generating a respective one of the regular expression automatons based on the simplified regular expression.

9. The computer-implemented method of claim 5, wherein automatically generating the multi-dimensional filters comprises:
receiving additional externally derived features; and
analyzing the externally derived features together with features of the regular expression automatons.

10. A computer program product comprising a computer-readable storage medium having program code embodied therewith, the program code executable by a processor to cause the processor to:
automatically generate regular expression automatons that match textual patterns of received formats, wherein each regular expression automaton is a superset of the format;
traverse the generated regular expression automatons to determine features;
automatically generate multi-dimensional filters by combining multiples of the features from the generated regular expression automatons, wherein each filter of the multi-dimensional filters includes features of a respective format set that has from two to fourteen total formats;
receive input data;
extract features from the input data;
apply the multi-dimensional filters to the extracted features of the received input data such that a relevant set of formats is identified, the relevant set of formats being a subset of a total number of the received formats;
execute a format matching exclusively on the identified relevant set of formats for the input data; and
as determined via the executing of the format matching on the identified relevant set of formats, output a set of one or more matched formats from the identified relevant set of formats and respective ranks of the input data with respect to the one or more matched formats.

11. The computer program product of claim 10, wherein the automatic generating of the regular expression automatons comprises:
automatically generating a regular expression using a finite regular expression format of the received formats, and automatically generating a respective one of the regular expression automatons based on the generated regular expression.

12. The computer program product of claim 10, wherein the automatic generating of the regular expression automatons comprises:
    automatically generating a simplified regular expression based on an initially generated regular expression, and
    automatically generating a respective one of the regular expression automatons based on the simplified regular expression.

13. The computer program product of claim 10, further comprising program code executable by the processor to cause the processor to:
    receive additional externally derived features; and
    analyze the externally derived features together with features of the regular expression automatons to generate the multi-dimensional filters.

14. The system of claim 1, wherein the multi-dimensional filters comprise multiple features selected from a group consisting of string length, minimum length, maximum length, may not contain a special character that is not a number or an alphabetic character, must contain a special character that is not a number or an alphabetic character, may not contain a number, must contain a number, may not contain an alphabetic character, must contain an alphabetic character, must start with numbers, must end with numbers, must start with an alphabetic character, and must end with an alphabetic character.

15. The computer-implemented method of claim 5, wherein the multi-dimensional filters comprise multiple features selected from a group consisting of string length, minimum length, maximum length, may not contain a special character that is not a number or an alphabetic character, must contain a special character that is not a number or an alphabetic character, may not contain a number, must contain a number, may not contain an alphabetic character, must contain an alphabetic character, must start with numbers, must end with numbers, must start with an alphabetic character, and must end with an alphabetic character.

16. The computer program product of claim 10, wherein the multi-dimensional filters comprise multiple features selected from a group consisting of string length, minimum length, maximum length, may not contain a special character that is not a number or an alphabetic character, must contain a special character that is not a number or an alphabetic character, may not contain a number, must contain a number, may not contain an alphabetic character, must contain an alphabetic character, must start with numbers, must end with numbers, must start with an alphabetic character, and must end with an alphabetic character.

17. The computer-implemented method of claim 5, wherein a number of the received formats is greater than one hundred.

18. The computer-implemented method of claim 5, wherein a first format of the received formats includes format restrictions of an expression length and a checksum, and a first regular expression automaton automatically generated that matches first textual patterns of the first format includes one of but not both of the expression length and the checksum.

19. The computer-implemented method of claim 5, wherein a first regular expression automaton of the generated regular expression automatons allows for false positives with respect to a format restriction of a first format of the received formats whose textual patterns are matched by the first regular expression automaton.

20. The computer-implemented method of claim 5, wherein a number of the received formats is greater than three hundred.

* * * * *